UNITED STATES PATENT OFFICE.

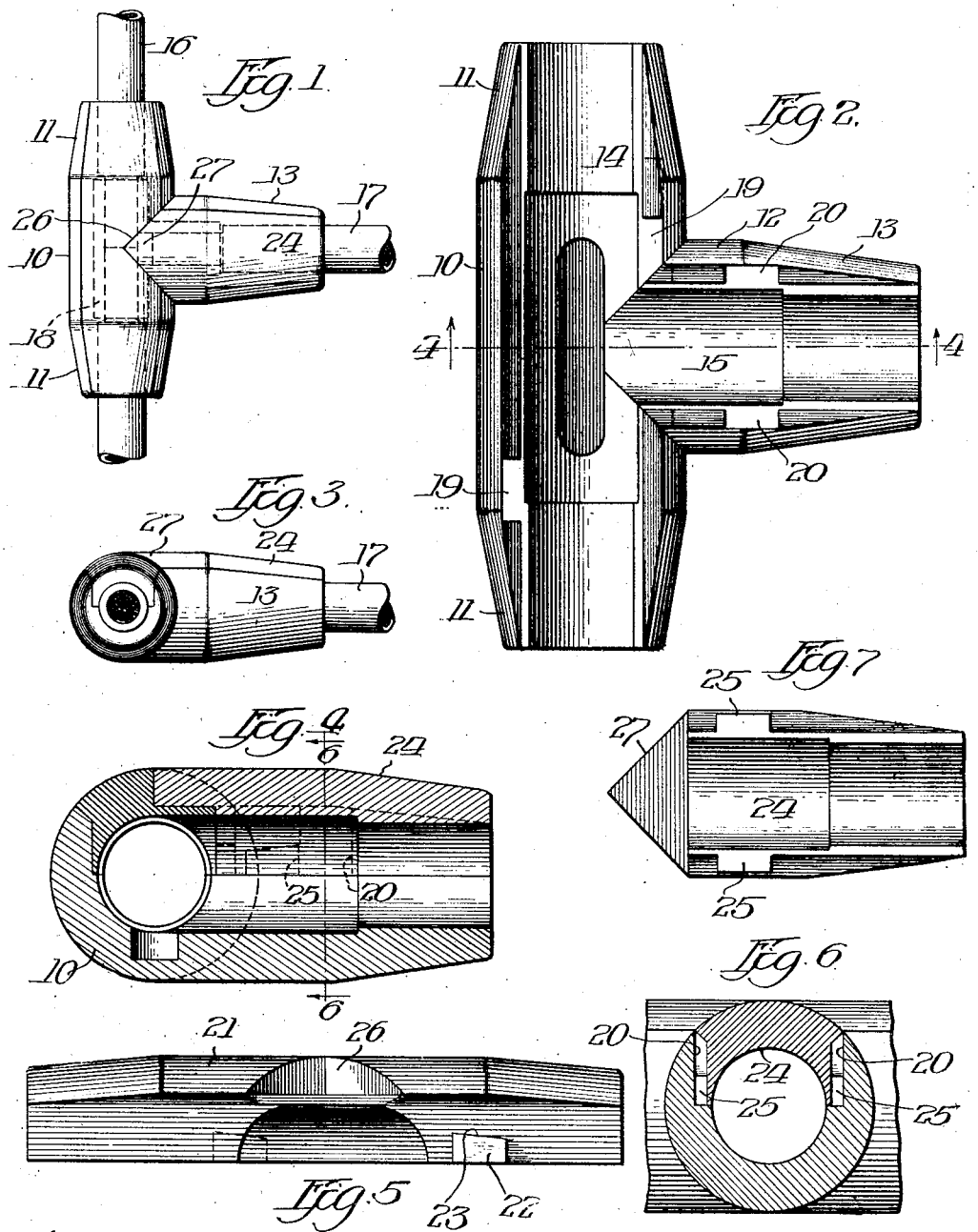

CARL O. BURTON, OF NEW DULUTH, MINNESOTA.

INSULATED JOINT.

1,148,498.  Specification of Letters Patent.  Patented Aug. 3, 1915.

Application filed June 3, 1914. Serial No. 842,603.

*To all whom it may concern:*

Be it known that I, CARL O. BURTON, a citizen of the United States, residing at New Duluth, in the county of St. Louis and State of Minnesota, have invented certain new and useful Improvements in Insulated Joints, of which the following is a specification.

My invention relates to electric conductors and has particular reference to a novel insulating device particularly adapted for use in protecting joints in heavy conductors.

It is a common practice in the connection of large size electric conductors to wind the connection with tape. In order to properly insulate such a connection it requires several pounds of tape and considerable time. Not only is this an expense in the installation but in case of required inspection the time and material is necessarily again expended. The desire and necessity for a simple connector which may be applied after the joint is made and which may be readily removed without destroying the insulator or without the expenditure of time is recognized. My device consists in a plurality of parts composed of insulating material and inclosing the wires and their joints each of the parts having registering lugs and recesses thus forming a bayonet joint. By the provision of this bayonet joint connection for the two parts the insulating device may be readily assembled or taken apart and when assembled is rigidly held in place.

The invention will be more readily understood by reference to the accompanying drawings wherein—

Figure 1 is a plan view of a connector such as contemplated by me and applied to line and intersecting wires; Fig. 2 is an enlarged plan view of the same with the covers and connecting wires removed; Fig. 3 is an end view of the construction shown in Fig. 1; Fig. 4 is a section on the line 4—4 of Fig. 2; Fig. 5 is an elevation of the cover for the members shown in Fig. 2; Fig. 6 is a section on the line 6—6 of Fig. 4; and Fig. 7 is a bottom plan of the cover for the extension accommodating the branch wire.

Referring more particularly to the drawings it will be seen that my insulator consists in a body portion 10 having tapered end portions 11 and a right angled extension 12 having a similar tapered end portion 13. This body portion is hollowed out as at 14 and 15 in order to receive therein the line and branch wires 16—17 respectively and their copper connector 18, shown in dotted lines in Fig. 1. The body portion 10 is provided with vertical notches or recesses 19 and the extension has similar recesses 20, both of which recesses are undercut as shown. A cover 21 is provided for the main portion, this cover having lugs 22 on opposite sides thereof, the upper surfaces of which lugs are slightly beveled at 23. These lugs extend within the recesses 19 and after location therein the cover is moved horizontally whereby the lugs are seated in the undercut portions of the recesses and the cover is securely locked in place. A cover 24 is likewise provided for the extension, this cover also having lugs 25 coöperating with the recesses 20 and being adapted to be seated in undercut portions thereof. It will be noted that the cover 21 is provided with a side notch 26, as best shown in Fig. 1, of triangular outline within which the pointed end 27 of the cover 24 is accommodated. Thus it will be seen that after the parts are in place the main cover 21 cannot be removed until the cover for the extension is removed. A bayonet joint connection is thus made between the parts, both the covers being seated by a movement in two directions.

The construction may be varied in many ways and such modifications as are within the scope of my claims I consider within the spirit of my invention.

I claim:

1. In an insulating device, the combination of joined wires, a rigid clamp of insulating material composed of a plurality of parts and inclosing the wires at their joint, each of said parts having registering lugs and recesses forming a bayonet joint, whereby said parts may be interlocked, substantially as described.

2. In an insulating device, the combination of a line wire and an intersecting branch wire joined thereto, a clamp of insulating material and composed of a plurality of interfitting parts, said parts having lugs and recesses whereby a bayonet joint connection is formed between said parts, substantially as described.

3. In an insulating device, the combination of a line wire and a branch wire joined thereto, a clamp having a rigid, right-angled extension accommodating said branch wire, an interlocking cover for said main clamping member and a separate cover for said extension, substantially as described.

4. In an insulating device, the combination of a line wire and a branch wire joined thereto, a clamp having a rigid lateral extension, an interlocking cover for said main clamp and an interlocking cover for said extension, the cover for said extension interlocking with the cover for said main clamp to prevent removal of said main clamp cover, substantially as described.

5. In an insulating device, the combination of a line wire and a branch wire joined thereto, a clamp having a rigid lateral extension, separate covers for said main clamp and said extension, said covers interlocking with the body portion and with each other, substantially as described.

6. In an insulating device, the combination of jointed wires and a rigid clamp of insulating material composed of substantially semicircular halves having registering lugs and recesses forming a bayonet joint whereby said parts may be interlocked, substantially as described.

7. In an insulating device, the combination of jointed wires and a rigid clamp of insulating material composed of substantially semicircular halves having registering lugs and recesses and adapted to lock together by the longitudinal movement of the parts relative to each other, substantially as described.

8. In an insulating device, the combination of jointed wires and a rigid clamp of insulating material composed of substantially semicircular halves, lugs upon one of the halves and recesses on the other half, adapted to receive the lugs, and tapered portions coöperative with the lugs to lock the two halves together when moved longitudinally relative to each other, substantially as described.

CARL O. BURTON.

Witnesses:
ERNEST FOGELBERG,
IRVING ASKE.

Copies of this patent may be obtained for five cents each, by addressing the "Commissioner of Patents, Washington, D. C."